United States Patent [19]

Best et al.

[11] Patent Number: 5,285,337
[45] Date of Patent: Feb. 8, 1994

[54] LIQUID-BEARING DATA RECORDING DISK FILE WITH TRANSDUCER CARRIER HAVING SUPPORT STRUTS

[75] Inventors: George L. Best, Morgan Hill; Moris M. Dovek, Pleasanton; John S. Foster, Morgan Hill; Luis P. Franco, Gilroy; Andrew M. Homola, Morgan Hill, all of Calif.

[73] Assignee: International Business Machines Corporation, Armonk, N.Y.

[21] Appl. No.: 876,843

[22] Filed: Apr. 30, 1992

[51] Int. Cl.$^5$ ................. G11B 5/60; G11B 17/32
[52] U.S. Cl. ............................ 360/97.02; 360/103
[58] Field of Search ............. 360/97.02, 103, 102, 360/97.01

[56] References Cited

U.S. PATENT DOCUMENTS

| | | | |
|---|---|---|---|
| 2,969,435 | 1/1961 | Lynott | 179/100.2 |
| 3,005,675 | 10/1961 | Ledin et al. | 346/74 |
| 3,060,431 | 10/1962 | Fuller et al. | 346/74 |
| 4,605,977 | 8/1986 | Matthews | 360/102 |
| 4,633,351 | 12/1986 | Bardos et al. | 360/102 |
| 4,894,740 | 1/1990 | Chhabra et al. | 360/103 |
| 4,901,185 | 2/1990 | Kubo et al. | 360/104 |
| 5,097,368 | 3/1992 | Lemke et al. | 360/97.02 |

FOREIGN PATENT DOCUMENTS

| | | | |
|---|---|---|---|
| 2010836 | 2/1990 | Canada. | |
| 54-23517 | 2/1979 | Japan. | |
| 56-107363 | 8/1981 | Japan | 360/103 |
| 61-151827 | 7/1986 | Japan | 360/103 |
| 8603048 | 5/1986 | PCT Int'l Appl. | 360/103 |

Primary Examiner—Robert S. Tupper
Assistant Examiner—Kevin M. Watkins
Attorney, Agent, or Firm—Thomas R. Berthold

[57] ABSTRACT

A data recording disk file of the liquid-bearing type has an improved head-disk interface provided by a transducer carrier with new properties. The carrier supports a conventional head for reading and writing data to the disk. The carrier has an air-bearing surface near its front end, a ski pad near its rear end, and a plurality of ski feet or struts which support the air-bearing surface off the liquid film of the disk when the disk file is not operating. The air-bearing surface is in the form of a pair of air-bearing rails located forward and outboard of the rear ski pad so that no air-bearing effect occurs in the rearward region of the carrier to assure the skiing action of the rear ski pad. The struts are separated from the air-bearing rails to not interfere with their air-bearing performance and support the rails away from the liquid film on the disk. In one embodiment there are at least three struts arranged on the carrier so that both the air-bearing rails and the ski pad are supported off the liquid film when the disk file is not operating. As operational speed is approached the air-bearing effect causes the front end of the carrier to rotate about the two rear struts, thus raising the forward strut(s) and the air-bearing rails off the disk and lowering the rear ski pad into contact with the liquid film.

8 Claims, 7 Drawing Sheets

LIQUID-BEARING DATA RECORDING DISK FILE WITH TRANSDUCER CARRIER HAVING SUPPORT STRUTS

TECHNICAL FIELD

This application is related to concurrently-filed co-pending application U.S. Ser. No. 07/876,236, now U.S. Pat. No. 5,267,104 issued Nov. 30, 1993.

This invention relates to data recording disk files of the type referred to as liquid-bearing disk files wherein the head or transducer carrier and a liquid lubricant on the disk surface provide a new type of head-disk interface. More particularly, the invention relates to a liquid-bearing disk file having an improved transducer carrier at the head-disk interface.

BACKGROUND OF THE INVENTION

Disk files, also referred to as disk drives, are information storage devices which utilize a rotatable disk with concentric data tracks containing the information, a head or transducer for reading or writing data onto the various tracks, and an actuator connected to a carrier for the head for moving the head to the desired track and maintaining it over the track centerline during read or write operations. There are typically a plurality of disks separated by spacer rings and stacked on a hub which is rotated by a disk drive motor. A housing supports the drive motor and head actuator and surrounds the head and disk to provide a substantially sealed environment for the head-disk interface. In conventional magnetic recording disk files the head carrier is an air-bearing slider which rides on a bearing of air above the disk surface. The slider is maintained against the disk surface by a small force from a suspension which connects the slider to the actuator, so that the slider is in contact with the disk surface during start and stop operations when there is insufficient disk rotational speed to maintain the air-bearing. A lubricant is required on the disk surface to prevent damage to the head and disk during starting and stopping of the disk file.

There are several references which describe different types of head carriers and liquid-bearings as possible alternatives to the conventional air-bearing head-disk interface in magnetic recording disk files. In assignee's U.S. Pat. No. 2,969,435, a sled-type transducer carrier with a large flat surface rides on a layer of oil on the disk, the oil being supplied from an oil reservoir external to the disk file and discharged from a nozzle located ahead of the carrier. In assignee's pending application, U.S. Ser. No. 264,604, filed Oct. 31, 1988, and published May 9, 1990 as European published application EP 367510, a disk file utilizes a continuously recirculating low viscosity liquid lubricant, which is maintained as a relatively thick layer on the disk, and a transducer carrier which has triangular shaped feet to plow through the low viscosity liquid layer. The EP reference suggests that if the disk file is hermetically sealed with no air present the low vapor pressure lubricant can evaporate which allows the required recirculation of the lubricant to occur by distillation.

More recently, in assignee's co-pending applications U.S. Ser. Nos. 07/724,646 and 07/724,696, a liquid-bearing disk file and transducer carrier have been described wherein a non-recirculating high viscosity lubricant film is maintained on the disk and a transducer carrier, having specially adapted ski feet, skis on the liquid film as the disk rotates. The transducer carrier described in those applications is a modified three-rail air-bearing slider which has a forward ski foot formed on each of the outer rails and a rear ski foot formed on the center rail, the ends of the three ski feet being essentially coplanar. When the disk file reaches operating speed, the forward ski feet are raised above the liquid film due to the air-bearing effect of the slider rails, while the liquid lubricated rear ski foot skis on the liquid film.

There are several challenges facing the developers of improved liquid-bearing disk files with skiing transducer carriers. The carrier must provide a low static friction ("stiction") head-disk interface because liquid-bearing disk files generally have larger amounts of free lubricant and smoother disks than air-bearing disk files. The carrier must also be designed to minimize lubricant depletion from the disk. In addition, the carrier must be able to perform adequately over a wide range of relative carrier-disk velocities which occur at different disk radii. Thus, what is needed is a liquid-bearing disk file with an improved head-disk interface which reduces stiction, minimizes lubricant depletion from the disk, and permits the transducer carrier to ski over a wide range of velocities.

SUMMARY OF THE INVENTION

The invention is a data recording disk file of the liquid-bearing type which has an improved head-disk interface provided by a transducer carrier with new properties. The carrier has an air-bearing surface near its front end, a ski pad near its rear end, and a plurality of ski feet or struts which support the air-bearing surface off the liquid film of the disk when the disk file is not operating. The air-bearing surface is in the form of a pair of air-bearing rails located forward and outboard of the rear ski pad so that no air-bearing effect occurs in the rearward region of the carrier to assure the skiing action of the rear ski pad. The struts are separated from the air-bearing rails, to not interfere with their air-bearing performance, and extend from the disk side of the carrier beyond the rails to support the rails away from the liquid film on the disk, thereby minimizing the effect of stiction. In one embodiment there are at least three struts arranged on the carrier so that both the air-bearing rails and the rear ski pad are supported off the liquid film when the disk file is not operating. As operational speed is approached the air-bearing effect causes the front end of the carrier to rotate about the two rear struts, thus raising the forward strut(s) and the air-bearing rails off the disk and lowering the rear ski pad into contact with the liquid film.

DESCRIPTION OF THE PREFERRED EMBODIMENTS

Liquid-Bearing Disk File With Skiing Carrier

The liquid-bearing disk file with the skiing transducer carrier referenced in the co-pending applications will be described briefly with respect to FIGS. 1-5.

Figure 1:
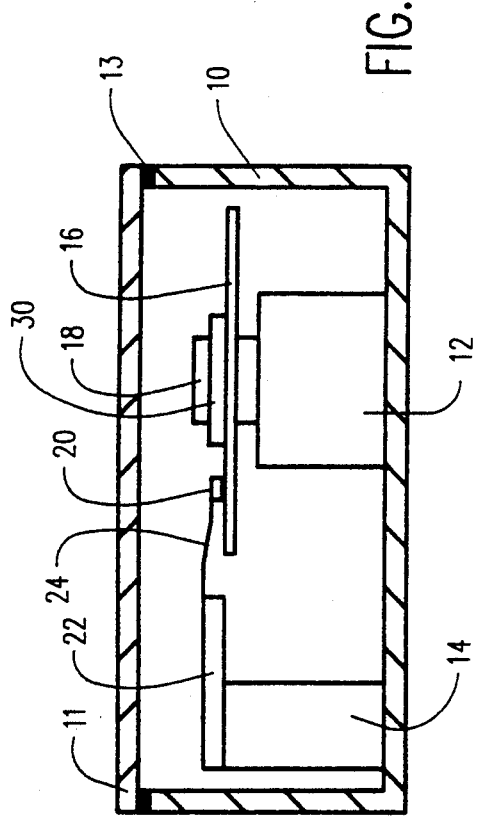
FIG. 1 is a view in section of a schematic of a liquid-bearing disk file.

Referring first to FIG. 1, there is illustrated in sectional view a schematic of a liquid-bearing disk file. The disk file comprises a base 10 to which are secured a disk drive motor 12 and an actuator 14, and a cover 11. The base 10 and cover 11 provide a substantially sealed housing for the disk file. Typically there is a gasket 13 located between base 10 and cover 11 and a small breather port (not shown) for equalizing pressure between the interior of the disk file and the outside environment. This type of disk file is described as being substantially sealed since the drive motor 12 is located entirely within the housing and there is no external forced air supply for cooling the interior components. A magnetic recording disk 16 is connected to drive motor 12 by means of hub 18 to which it is attached for rotation by the drive motor 12. A read/write head or transducer (not shown) is formed on a transducer carrier 20. The carrier 20 is connected to the actuator 14 by means of a rigid arm 22 and a suspension 24, the suspension 24 providing a biasing force which urges the transducer carrier 20 onto the surface of the recording disk 16. During operation of the disk file the drive motor 12 rotates the disk 16 at a constant speed, and the actuator 14, which is typically a linear or rotary voice coil motor (VCM), moves the transducer carrier 20 generally radially across the surface of the disk 16 so that the read/write head may access different data tracks on disk 16.

Figure 2:
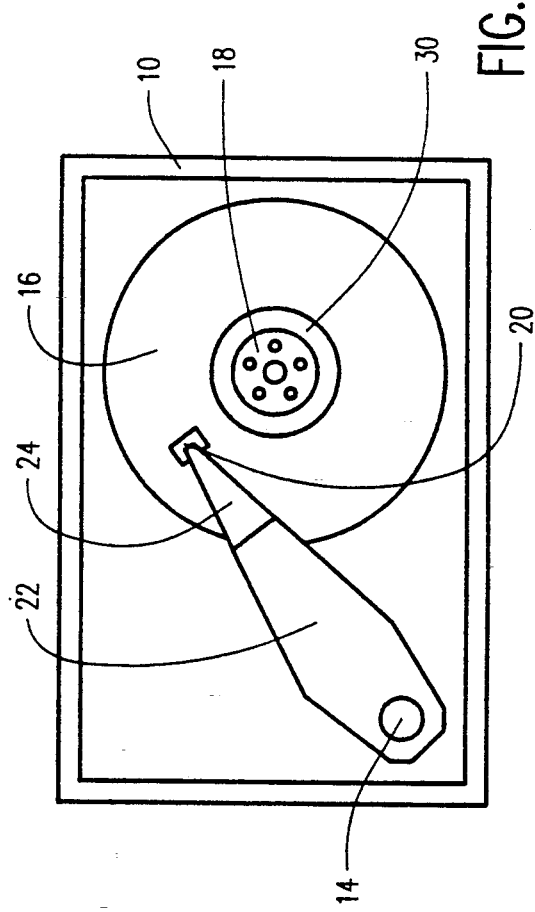
FIG. 2 is an open top view of the disk file depicted schematically in FIG. 1.

FIG. 2 is a top view of the interior of the disk file with the cover 11 removed and illustrates an annular lubricant reservoir 30, which serves as a means for holding a supply of liquid lubricant for replenishment of the liquid film on the surface of disk 16. A thin continuous film of a relatively high viscosity lubricant is maintained on the surface of disk 16 and is replenished by lubricant from the reservoir 30 during operation. FIG. 2 also illustrates in better detail the suspension 24 which provides a force to the carrier 20 to maintain the carrier in contact with the lubricant film on the disk 16. The suspension may be a conventional type of suspension such as that used in magnetic disk files which have an air-bearing slid Ⓡr. An example is the well-known Watrous suspension, as described in assignee's U.S. Pat. No. 4,167,765, which is incorporated herein by reference. This type of suspension also provides a gimballed attachment of the transducer carrier which allows the carrier to pitch and roll as it rides on the liquid lubricant film.

Figure 3:
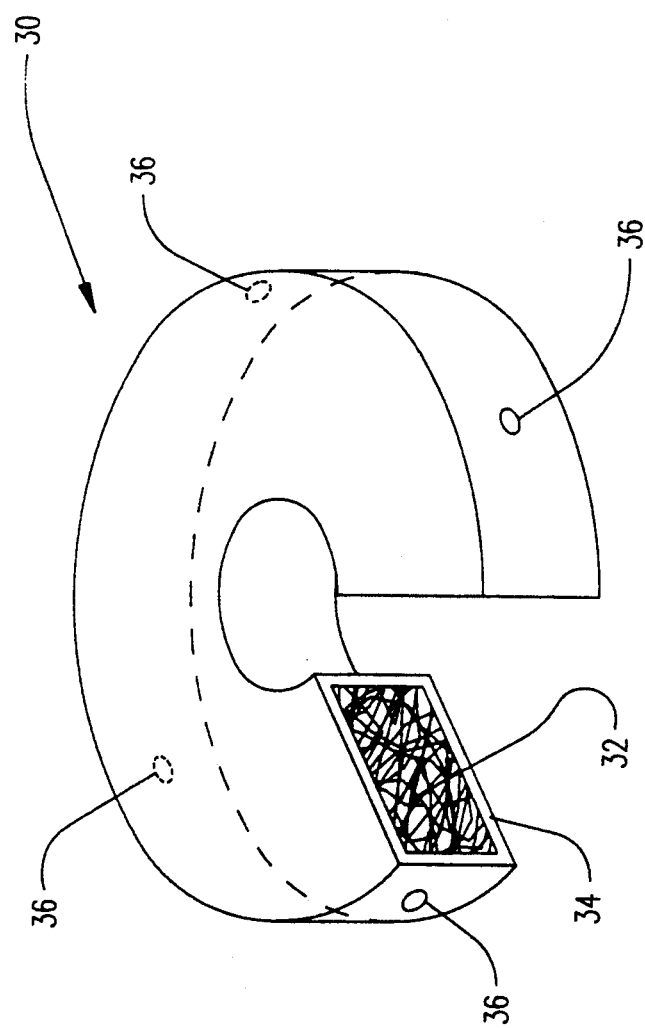
FIG. 3 is a perspective view of a spacer ring lubricant reservoir shown in partial cutaway of the type used in a liquid-bearing disk file.

The annular lubricant reservoir 30 Which may also serve as a disk spacer in disk files which have multiple disks in a disk stack, is shown in detail in FIG. 3. The reservoir 30 comprises a ring or annulus 32 which is machined from a porous, sintered metal, such as sintered stainless steel. Thereafter the outer surface of the annulus 32 is entirely sealed, either by electroplating a material such as gold or by electroless plating of a nickel film, to provide a film 34 surrounding the sintered stainless steel. Openings 36 are then formed in the gold or nickel surface film 34 to unseal the reservoir and provide a means for the lubricant stored inside to escape. This is accomplished by machining several, e.g typically 4, small areas on the surface film 34 by etching, ablation or electrostatic discharge machining, which creates the openings 36 or pores in those areas. The reservoir is then filled with lubricant by placing it in a vacuum, immersing it in the lubricant, and heating it slightly to increase the rate at which it fills. The number and size of the openings 36 are selected to provide the desired amount of controlled lubricant escape during operation of the disk file, which is designed to match the rate at which lubricant leaves the disk. When the annulus 32 is designed to also serve as a spacer ring in disk files which have multiple disks supported in a stack on the hub 18, the openings 36 may be located nearer to the portions of the spacer ring which are in contact with the disks, so that selected openings are associated with one of the corresponding disk surfaces. In addition to the size of the openings 36, the factors which affect the rate of lubricant leaving the disk include the smoothness of the disk, the disk rotational speed, the viscosity of the lubricant, and the carrier design. When the disk is not rotating, the capillary action of the porous sponge-like material of annulus 32 holds the liquid inside the reservoir.

While the specific type of lubricant reservoir or holding means is not part of the present invention, there are numerous alternative reservoirs which are possible. For example, in some applications where the total running time of the disk file is relatively short (e.g. several months), the means for holding the lubricant may be a non-data band or region on the disk near the inside diameter of the disk. During the normal disk lubrication process, the non-data band of the disk is also lubed, so that the non-data band contains an additional supply of lubricant for replenishment of the liquid film. In this embodiment for this specific application, it may also be desirable to use a lubricant which has a higher viscosity so that the rate of depletion is somewhat reduced.

Figure 4:
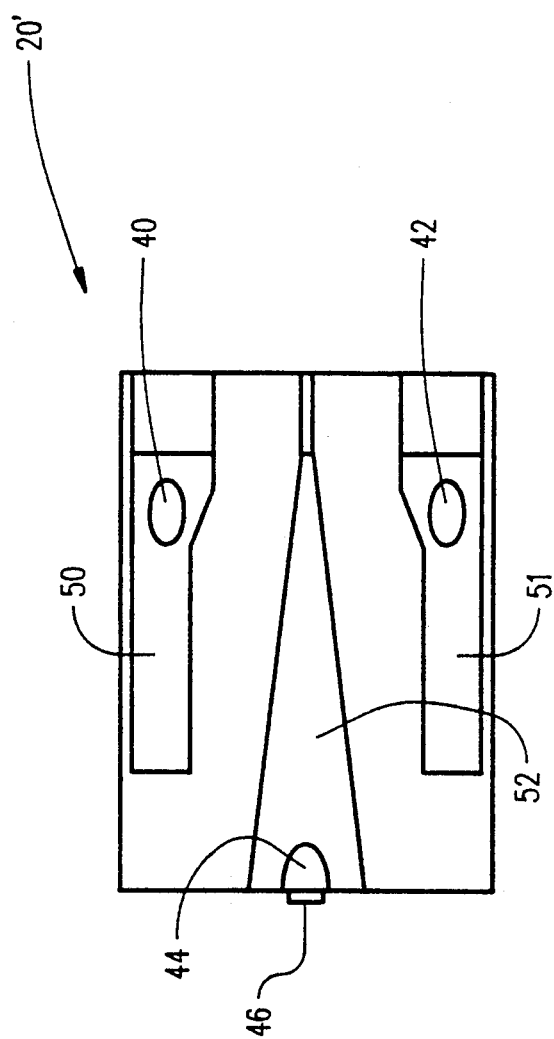
FIG. 4 is a plan view of the bottom or disk side of an air-bearing slider modified to have a ski surface.

FIG. 4 illustrates the transducer carrier, denoted 20, which is described in assignee's co-pending application U.S. Ser. No. 07/724,696. The ski feet 40,42,44 are formed on a conventional three-rail air-bearing slider, such as that described in assignees' U.S. Pat. No. 4,894,740. Each of the ski feet 40,42,44 is formed on the conventional bottom surface of the rails 50,51,52 by material etching the rails back a few thousand Angstroms, preferably by ion milling or alternatively by reactive ion etching or other etching means. The result is that the ski feet are the remaining outer portions of the rails projecting outwardly from the newly defined rails of the slider, with the ends of the ski feet being essentially coplanar. The ion milling is performed in a manner such that there is a slight taper of the ski feet away from the outer surface of the rails. This taper of the ski feet allows the transducer carrier to actually ski on top of the relatively high viscosity lubricant film on the disk.

Figure 5:
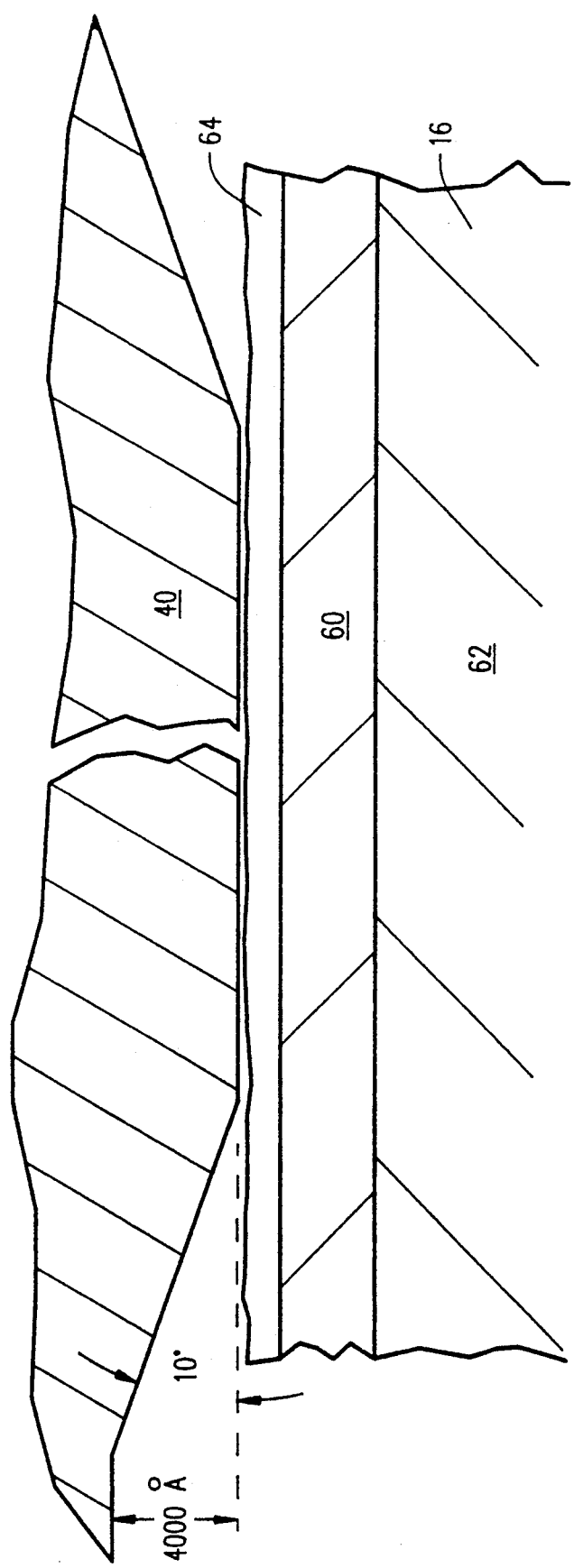
FIG. 5 is a sectional view of the carrier-disk interface of a liquid-bearing disk file with a skiing transducer carrier.

The interface between the transducer carrier and the disk with the lubricant film is illustrated in FIG. 5. In the preferred embodiment, the disk 16 has as its upper solid portion a conventional amorphous carbon overcoat film 60, which is typically approximately 250 Angstroms thick. The magnetic layer 62, such as a conventional cobalt alloy sputter deposited magnetic film, is located beneath the protective carbon overcoat 60. The liquid lubricant is deposited as a film 64, preferably to a thickness in the range of approximately 20 to 100 Angstroms, on top of the carbon overcoat 60. A portion of one of the ski feet 40 is depicted as being supported on the lubricant film 64. The end of ski foot 40 has a diameter of approximately 100 microns and is tapered at approximately a ten degree angle to an etch depth of approximately 4,000 Angstroms. The transducer 46 (FIG. 4) is supported on the trailing edge of the carrier 20 at the end of ski foot 44, and so is maintained at a spacing of approximately the lubricant film thickness (e.g. 20 to 100 Angstroms) from the top of the recording disk. During operation of the disk file the suspension 24 (FIG. 2) maintains a force on the carrier 20 forcing the ski feet 40,42,44 into contact with the lubricant film 64, which, because it is essentially incompressible, serves as a spacing layer between the carrier 20 and the disk 16. The relatively small angle between the end of ski foot 40 and the disk (10 degrees in FIG. 5) improves the ability of the carrier to ski as it provides less of a barrier to the lubricant which passes under the end of ski foot 40 during start up of the disk file. When the disk file reaches operating speed, the air-bearing rails 50,51 cause the ski feet 40,42 to lift off the liquid film, while the suspension maintains ski foot 44 in skiing contact with the liquid film.

Liquid-Bearing Disk File With Skiing Carrier of Present Invention

Figure 6:
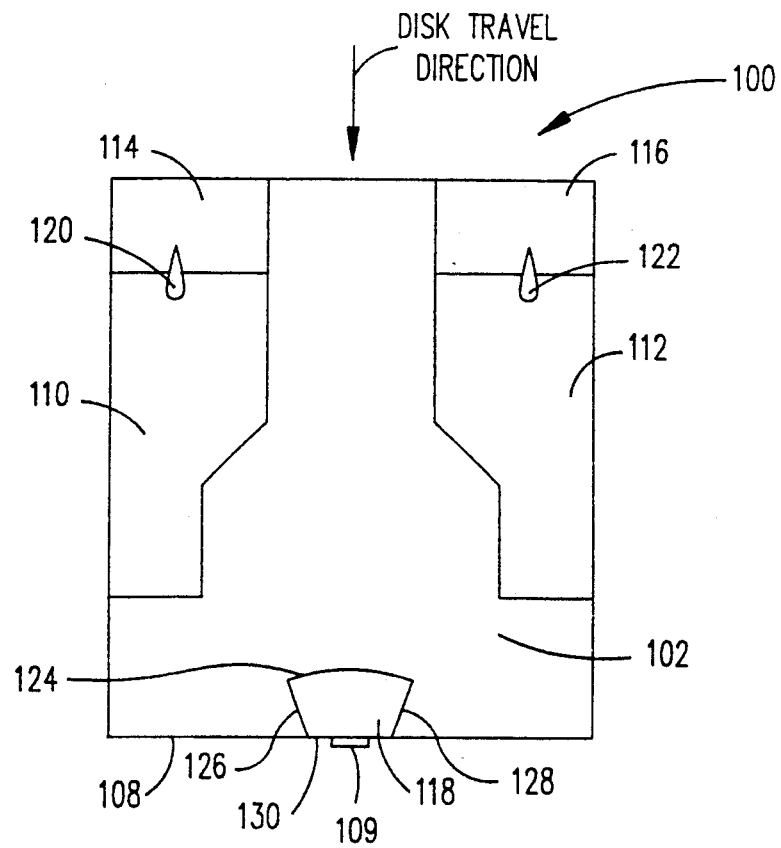
FIG. 6 is a plan view of the disk side of the skiing transducer carrier of the present invention.
Figure 7:
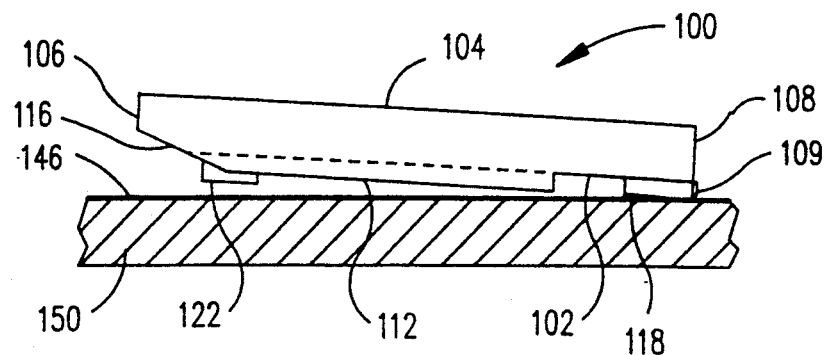
FIG. 7 is a side view of the carrier of FIG. 6 on a disk.

Referring now to FIGS. 6 and 7, there is illustrated an improved skiing transducer carrier 100. Carrier 100 has a disk side 102, a back side 104, a front end 106 and a trailing end 108. A transducer 109, such as a conventional thin film head for reading or writing data from the disk, is formed on the trailing end 108 of carrier 100. Head 109 may be an inductive read and write transducer or an inductive write transducer with a magnetoresistive (MR) read transducer formed by thin film deposition techniques as is well known in the art. An air-bearing surface is provided on the disk side 102 of carrier 100 in the form of a pair of rails 110,112, each rail having a respective front taper 114,116. Also located on the disk side 102 near trailing end 108 is a ski foot or pad 118 which provides a skiing surface for skiing on the liquid film 146 maintained on disk 150 (FIG. 7). As shown in FIG. 7, the skiing surface of ski pad 118 is essentially coplanar with the air-bearing surface of rails 110,112. Extending from the air-bearing rails 110,112 near the rear end of tapers 114,116 are a pair of forward ski feet or struts 120,122. As can be understood from FIG. 7, the struts 120,122 would provide a static pitch-up position for carrier 100 if the carrier were at rest on the surface of disk 150. Thus, when at rest the air-bearing surface of rails 110,112 is maintained essentially out of contact with the liquid film 146 on disk 150, thereby minimizing the static friction at the carrier-disk interface. The static pitch-up of the carrier due to the struts 120,122 also defines the shallow angle between ski pad 118 and the liquid film 146 on the disk, which facilitates the skiing function of the ski pad, in the manner as described with respect to FIG. 5. In addition, the ends of the struts, because they are in a plane parallel to but not coplanar with the ski pad surface, also define a shallow angle with the liquid film. The dimensions of air-bearing rails 110,112 are selected such that at the low end of the velocity range of operation of the disk file approximately 80% of the suspension load is borne by the air-bearing, while the remaining load is borne by ski pad 118. Thus, at operational speed the front end of carrier 100 and the struts 120,122 are maintained out of contact with the liquid film 146 and the rear ski pad 118 skis on the liquid film 146, in the manner essentially as shown in FIG. 7. Because there is a lack of any significant air lift in the rear region of the carrier 100 due to the absence of air-bearing rails in that region, the ski pad 118 is maintained in contact with the liquid film 146 on the disk 150 over a wide velocity range. This maintains the transducer 109 in close spacing to the magnetic layer on the disk 150.

Ski pad 118 has a leading edge 124 which is wider than its trailing edge 130. The sides 126,128 of ski pad 118 are thus slanted relative to the length of the slider. In the preferred embodiment the sides 126,128 are angled approximately 20 degrees relative to the length of the slider. By making the rear ski pad 118 wider in the front than in the back, the ski pad 118 is prevented from acting as a plow, thereby minimizing depletion of the lube in the wake of movement of the disk 150 under the ski pad 118. This also maintains low drag and results in a minimization of thinning of the lubricant under the pad 118. In disk files with rotary actuators, the length of the slider is tangent to the disk at only one track position. For example, in one commercially available 2 ½" disk drive the slider is skewed at approximately −4 degrees at the inside diameter (ID) and +17 degrees at the outside diameter (OD). By making the angle of the sides 126,128 of ski pad 118 greater than the maximum absolute value of skew, for example approximately 20 degrees, it is assured that the ski pad remains non-plowing over the complete angle range of operation of the disk file as the carrier moves from disk ID to disk OD. This permits the carrier 110 to ski properly over the full range of relative carrier-disk velocities experienced from disk ID to OD.

The leading edge 124 of ski pad 118 has an essentially convex curvature with a radius of curvature on the order of the width of the straight-back trailing edge 130. The local convexity of the shape of leading edge 124, combined with the fact that the front portion of carrier 100 is maintained off of the surface of disk 150 as shown in FIG. 7, minimizes any plowing action and guides any loose debris that may be present on the disk to either side of pad 118.

It has been determined that with the rear ski pad design of the present invention it is possible to eliminate the lubricant reservoir for some disk file applications. In one experiment several liquid bearing disk files were assembled without a lubricant reservoir of any type and with a transducer carrier like that depicted in FIG. 4, but modified so that the rear ski pad 44 had the shape of the ski pad 118 in FIG. 6. These files have operated continuously for over five months, with only occasional start/stops and intermittent tear downs to check for wear. No wear has been observed and the files continue to operate. Thus while there are some applications of disk files which will require very long run times and thus some means of maintaining the liquid film on the disk will be a necessity, in certain applications where the run time is significantly shorter, the transducer carrier of the present invention will permit the elimination of a reservoir. Such disk files will thus be less complex and costly.

Figure 8A:
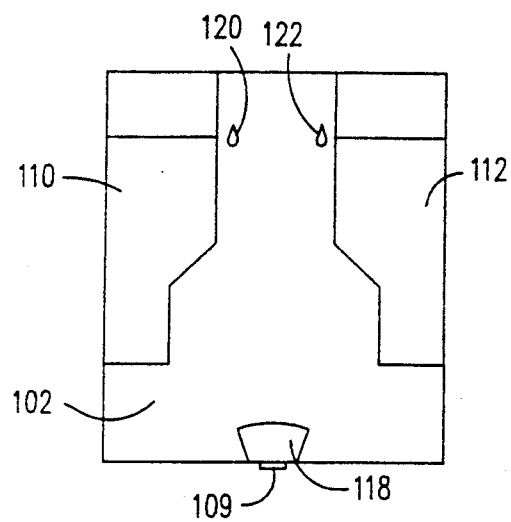
FIGS. 8A and 8B are plan views of alternative embodiments of the skiing transducer carrier of the present invention, illustrating alternative positions of the front ski feet or struts.
Figure 8B:
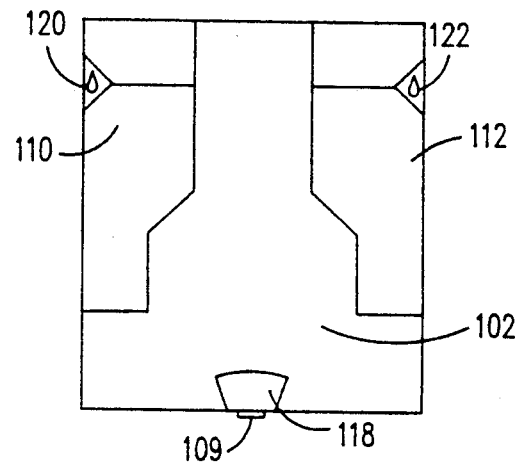

Referring now to FIGS. 8A-8B, there are illustrated other embodiments of the carrier wherein the struts 120,122 are located inboard or outboard of the air-bearing surface rails 110,112, rather than on the rails as in the embodiment of FIG. 6. In these embodiments, the struts 120,122 extend directly from the disk side 102 of the carrier. These embodiments have the advantage that since the struts 120,122 are not formed on the rails 110,112, any effect on the performance of the air-bearing is eliminated. In addition, at start and stop of the disk file there is no accumulation of lubricant on the rails near the struts, so that stiction is reduced.

Figure 8C:
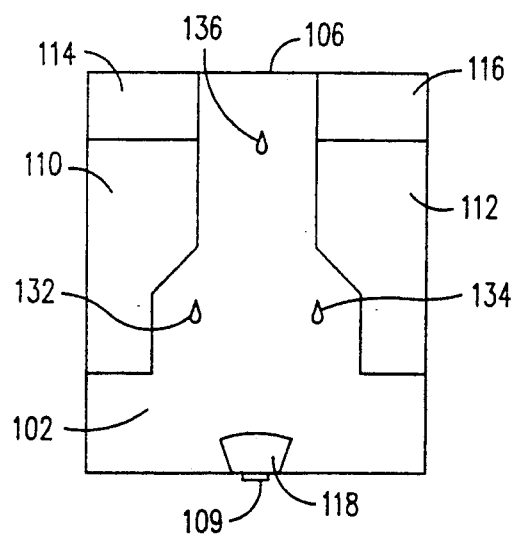
FIGS. 8C and 8D are alternative embodiments of the skiing transducer carrier of the present invention, illustrating additional ski feet or struts for supporting the carrier when the disk file is not operating.
Figure 8D:
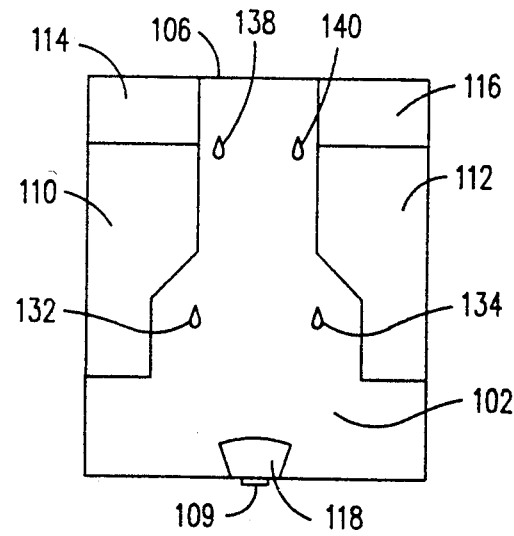

Referring now to FIGS. 8C-8D, there are illustrated alternative embodiments to the carriers of FIG. 6 and FIGS. 8A-8B in that the carriers are provided with either 3 or 4 struts to maintain the ski pad 118 out of contact with the lubricant film on the disk when the disk file is not operating. In FIGS. 8C-8D struts 132,134 are formed on disk side 102 rearward of the center of mass of the carrier. When the carrier is at rest in the disk file, the carrier sits on struts 132,134 as well as single forward strut 136 in FIG. 8C or dual forward struts 138,140 in FIG. 8D. At start up of the disk file the transducer carrier initially skis on all three or four struts and then rotates about the rear struts 132,134 due to the air-bearing lift provided by rails 110,112. At full operational speed the carrier has rotated onto the ski pad 118 and all of the struts are maintained out of contact with the liquid film on the disk. The advantage of the embodiment of FIG. 8D over that of FIG. 8C is that because there is no strut directly in the path between the carrier front end 106 and ski pad 118 in the carrier of FIG. 8D, lubricant accumulation on the rear ski pad 118 due to spraying at start and stop is eliminated.

Method of Manufacturing the Skiing Carrier of the Present Invention

The preferred method of manufacturing the skiing transducer carrier will be described with reference to FIGS. 9A-9F, which illustrate the steps of manufacturing the carrier depicted in FIG. 8A. FIGS. 9A-9F are sectional views of the carrier taken through a section intersecting the struts 120,122.

Figure 9A:
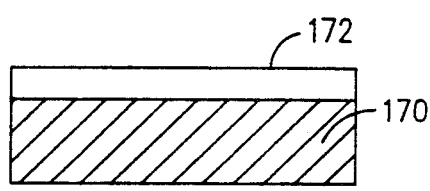
FIGS. 9A-9F are sectional views of the skiing transducer carrier of FIG. 8A illustrating sequential steps in the fabrication of the carrier of FIG. 8A.
Figure 9B:
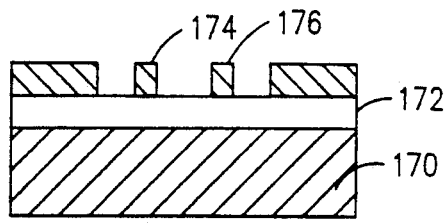
Figure 9C:
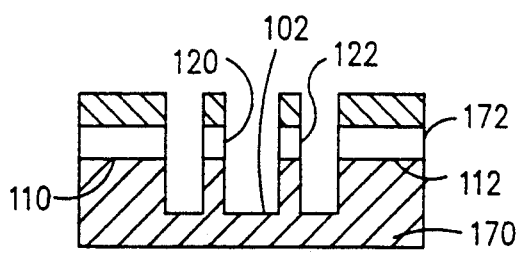
Figure 9D:
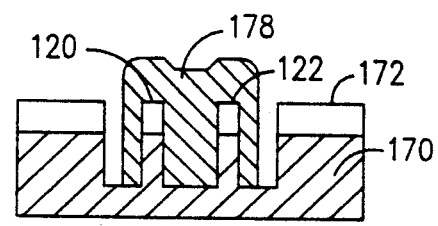
Figure 9E:
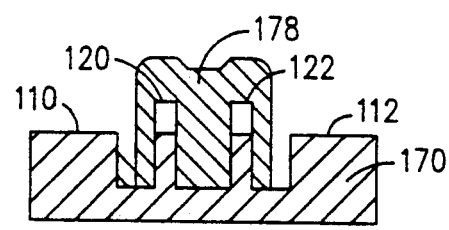
Figure 9F:
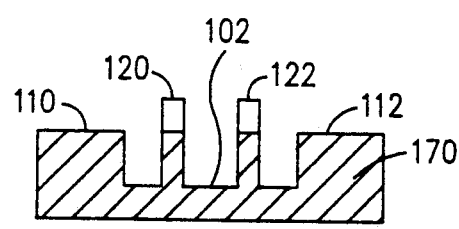

In FIG. 9A a multilayer overcoat 172 is sputter deposited onto carrier body 170. The body 170 of the carrier is typically formed of a conventional ceramic mixture of titanium carbide (TiC) and alumina ($Al_2O_3$). The overcoat 172 comprises a first 50 Angstroms layer of silicon (Si) sputter deposited onto body 170, followed by 150 Angstroms of amorphous hydrogenated carbon (H:C), 50 Angstroms of Si and a final layer of 2000 Angstroms H:C. The overcoat, the major portion of which is the final 2000 Angstroms layer of H:C, is essentially carbon which will ultimately form the struts 120,122. A layer of photoresist, such as Riston brand of poly methylmethacralate (PMMA), is then rolled on top of overcoat 172 to a thickness of approximately 0.08 millimeters. The photoresist is then exposed through a suitable mask which defines a pattern corresponding to the air-bearing rails 110,112, rear ski pad 118 and struts 120, 122. After development and removal of the unexposed photoresist, the carrier is as depicted in FIG. 9B, with photoresist areas remaining over the overcoat 172 in the areas where the air-bearing rails 110,112, rear ski pad 118 and struts 120,122 will ultimately be formed. The photoresist areas over the areas where struts 120,122 will be formed are identified as photoresist islands 174,176 in FIG. 9B. An oxygen plasma etching or ashing process is then performed to remove the Si-C multilayer overcoat in the regions unprotected by photoresist. Thereafter a reactive ion etching process is performed to etch away the carrier body 170 down to the depth of disk side 102 to define the air-bearing rails 110,112 and rear ski pad 118, with the result being depicted in FIG. 9C. The remaining photoresist is next removed and a second photoresist layer is applied and exposed and developed, leaving a resist island 178 just over struts 120,122, as depicted in FIG. 9D. A subsequent ashing process removes the remaining Si-C multilayer overcoat from the areas unprotected by the photoresist, as depicted in FIG. 9E, to define rails 110,112. Finally, as shown in FIG. 9F, the remaining photoresist layer 178 is removed, resulting in the completed carrier formed from carrier body 170 and having air-bearing rails 110,112, and struts 120,122 formed of the Si-C multilayer overcoat and extending beyond rails 110,112 by approximately 2150 Angstroms, the thickness of the sputter deposited Si-C overcoat. While not shown in the sectional views of FIGS. 9E and 9F, rear ski pad 118 has also been formed during the process with its skiing surface being formed coplanar with the air-bearing surface of rails 110,112.

Experimental Results

The transducer carrier depicted in FIG. 8A was fabricated by the described process with carbon struts 120,122 extending from disk side 102 to approximately 1400 Angstroms beyond the air-bearing surface of rails 110,112. The carrier was tested on a 2 ⅛"thin film disk having a cobalt-platinum-chromium magnetic layer and a 150 Angstroms protective carbon overcoat. A conventional perfluoropolyether lubricant (Demnum brand SP) was applied by dipping to form a liquid film with a thickness of approximately 40 Angstroms on the carbon overcoat. The load applied to the carrier by the suspension was in the range of 4-6 grams. The velocity at which the struts 120,122 lifted off the disk was in the range of approximately 3-4 meters per second. The rear ski pad 118 was measured to be in contact with the liquid film from this range up to approximately 15-20 meters per second. The static friction was measured to be approximately 5 grams, and the drag was measured to be approximately 0.1-0.4 grams throughout the file operational velocity range of 5.5-11 meters per second. Both of these values are adequate to prevent operational problems in the disk file. The thickness of the lubricant was measured as a function of run time during track following operation of the disk file. Starting with an initial lubricant thickness of approximately 40 A, lubricant depletion was measured to be less than 5 Angstroms after two days of track following.

While the preferred embodiments of the present invention have been illustrated in detail, it should be apparent that modifications and improvements may be made to the invention without departing from the spirit and scope of the invention as described in the following claims.

What is claimed is:

1. A data recording disk file comprising:
   at least one data disk having a liquid film thereon;
   a motor connected to the disk for rotating the disk;

a transducer for writing data to or reading data from the disk;

a transducer carrier having a disk side, a front end and a trailing end, the carrier comprising an air-bearing surface on the disk side near the front end, a liquid-bearing ski surface on the disk side near the trailing end, and at least three struts on the disk side and separated from the air-bearing surface for supporting the air-bearing surface and the ski surface off the disk when the disk in not rotating, two of said struts being located rearward of the center of mass of the carrier, whereby the ski surface is rotated into contact with the liquid film on the disk as the air-bearing surface is rotated away from the disk when operational speed of the disk file is approached;

an actuator for moving the carrier generally radially across the disk so the transducer may access different regions of data on the disk;

means connecting the carrier to the actuator for urging the ski surface of the carrier into contact with the liquid film on the disk during rotation of the disk; and means for supporting the motor and actuator.

2. The data recording disk file according to claim 1 further comprising means for supplying liquid to the disk to maintain the liquid film on the disk.

3. A transducer assembly for a data recording disk file which utilizes a liquid-bearing head-disk interface, the assembly comprising:

a transducer carrier having a disk side, a front end and a trailing end, the carrier comprising an air-bearing surface on the disk side near the front end, a liquid-bearing ski surface on the disk side near the trailing end, and at least three struts on the disk side and separated from the air-bearing surface for supporting the air-bearing surface and the ski surface off the disk when the disk is not rotating, two of said struts being located rearward of the center of mass of the carrier, whereby the ski surface is rotated into contact with the liquid film on the disk as the air-bearing surface is rotated away from the disk when operational speed of the disk file is approached, and;

a transducer located on the carrier near the carrier trailing end for reading data from or writing data to the disk.

4. The transducer assembly according to claim 3 wherein the struts are located inboard of the air-bearing surface.

5. The transducer assembly according to claim 3 wherein the struts are located outboard of the liquid-bearing ski surface, whereby no struts are located between the ski surface and the disk front end.

6. The transducer assembly according to claim 3 wherein the air-bearing surface comprises two air-bearing rails, each rail being spaced outboard of the liquid-bearing ski surface.

7. The transducer assembly according to claim 3 further comprising means for connecting the carrier to the actuator of the disk file, the carrier to actuator connecting means including means for biasing the ski surface of the carrier into contact with the liquid film on the disk.

8. The transducer assembly according to claim 7 wherein the carrier to actuator connecting means includes means for providing generally gimballed movement of the carrier, whereby the carrier may pitch and roll as its ski surface is forced into contact with the liquid film during rotation of the disk.

* * * * *